United States Patent [19]
Bonser

[11] Patent Number: 5,797,634
[45] Date of Patent: Aug. 25, 1998

[54] QUICK CONNECT FLUID COUPLING HAVING ATTACHMENT

[75] Inventor: Harvey S. Bonser, Redford, Mich.

[73] Assignee: STMC-LLC, Farmington, Mich.

[21] Appl. No.: 881,973

[22] Filed: Jun. 25, 1997

[51] Int. Cl.⁶ .................................... F16L 39/00
[52] U.S. Cl. .............. 285/319; 285/906; 285/921
[58] Field of Search ........................ 285/319, 320, 285/906, 921, 305

[56] References Cited

U.S. PATENT DOCUMENTS

| | | | |
|---|---|---|---|
| 4,844,515 | 7/1989 | Field | 285/305 |
| 4,929,002 | 5/1990 | Sauer | 285/319 |
| 4,964,658 | 10/1990 | Usui et al. | 285/921 X |
| 4,969,667 | 11/1990 | Sauer | 285/319 X |
| 5,005,878 | 4/1991 | Smith | 285/319 |
| 5,228,729 | 7/1993 | McElroy et al. | 285/319 |
| 5,303,963 | 4/1994 | McNaughton et al. | 285/319 |
| 5,374,084 | 12/1994 | Potokar | 285/319 X |
| 5,609,370 | 3/1997 | Szabo et al. | 285/319 |
| 5,711,553 | 1/1998 | Bonser | 285/319 |

*Primary Examiner*—Dave W. Arola
*Attorney, Agent, or Firm*—Brooks & Kushman P.C.

[57] ABSTRACT

A quick connect fluid coupling (20) includes an attachment clip (30) for securing a female connector member (22) and a tube member (26) to each other. The attachment clip (30) has a central portion (32) including an opening (34) that receives the tube member (26) and has flat attachment legs (36) that extend from the central portion (32) in a diverging relationship from each other. Each attachment leg (36) has a window (38) including an attachment edge (40) that engages an attachment surface (46) on the female connector member 22 between inner and outer portions (50) and (52).

10 Claims, 2 Drawing Sheets

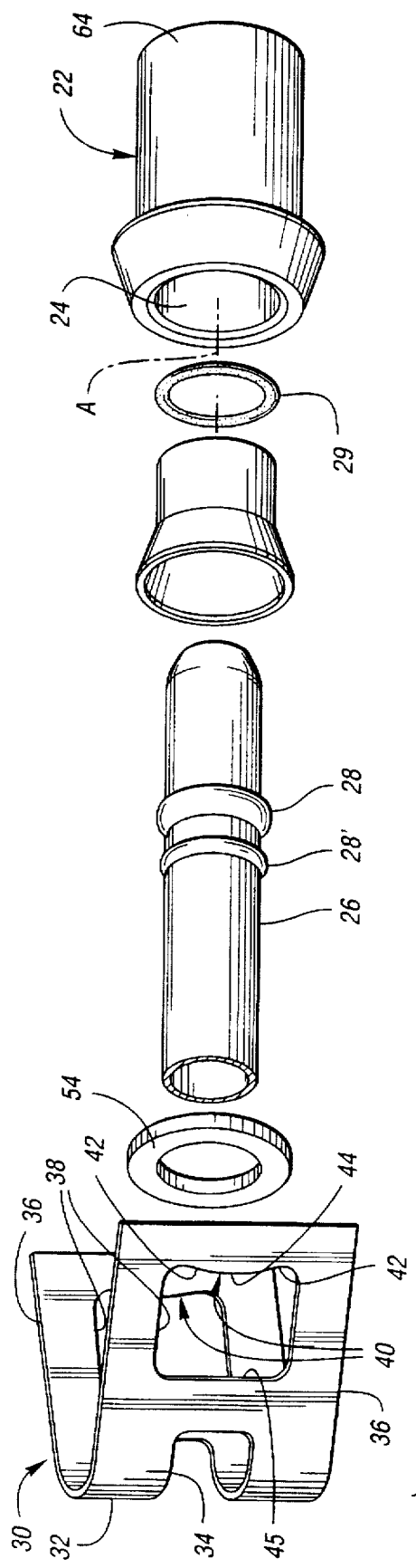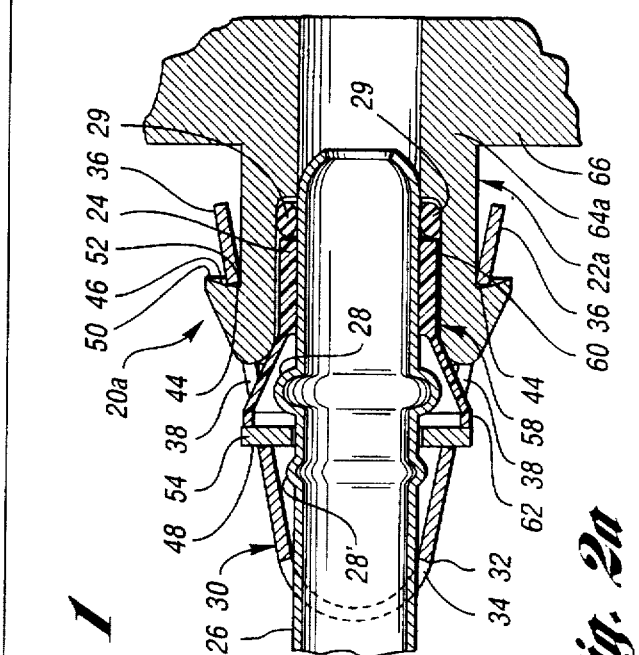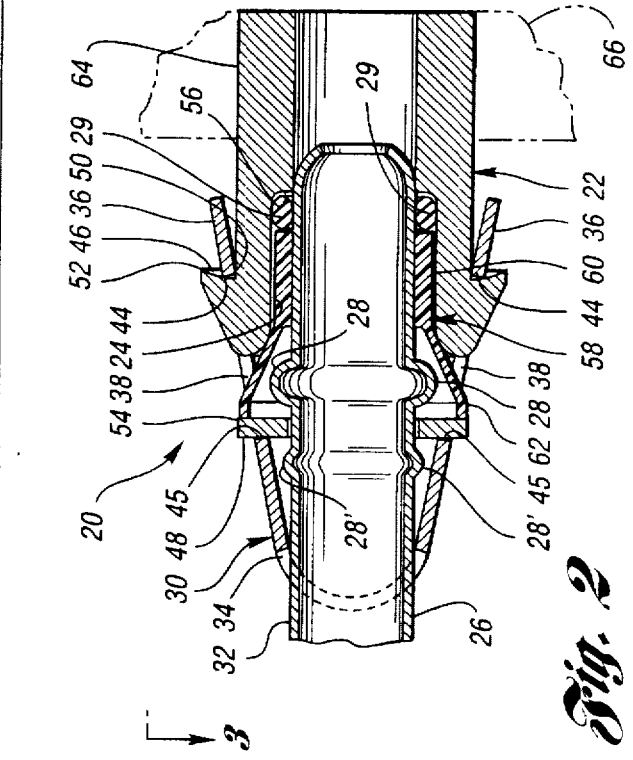

QUICK CONNECT FLUID COUPLING HAVING ATTACHMENT

TECHNICAL FIELD

This invention relates to a quick connect fluid coupling.

BACKGROUND ART

Quick connect fluid couplings are used extensively in connection with vehicle brakes, transmissions and fuel systems. Such fluid couplings conventionally include a female connector member having a central passage as well as including a tube member that has an annular flange and is received by the passage of the female connector member in fluid communication therewith and with an O-ring normally providing a fluid-tight seal between the members. An attachment clip is conventionally used to detachably secure the tube member flange and the female connector member to each other. Such attachment clips as disclosed by U.S. Pat. No. 5,005,878 Smith often have a generally U-shape that is snapped around the members from one side with a construction that can unintentionally become disconnected. Another type of attachment clip such as disclosed by U.S. Pat. No. 4,844,515 Field, U.S. Pat. No. 4,929,002 Sauer, U.S. Pat. No. 5,228,729 McElroy et al and U.S. Pat. No. 5,303,963 McNaughton et al have bent tabs that secure a connection between the female connector member and the tube member; however, such bent tabs are susceptible to further bending upon the application of a disconnect force and thus have limited strength in preventing forced withdrawal of the tube member from the female connector member. U.S. Pat. No. 5,609,370 discloses a quick connect coupling having a retainer including legs with apertures that receive projections on another component to provide locking.

DISCLOSURE OF INVENTION

An object of the present invention is to provide an improved quick connect fluid coupling.

In carrying out the above object, the quick connect fluid coupling of the invention includes a female connector member having a central passage and also includes a tube member that has an annular flange and is received by the passage of the female connector member in fluid communication therewith so as to be capable of transmitting fluid pressure and containing fluid flow such as often is necessary with vehicle brakes, transmissions and fuel systems, etc. The quick connect fluid coupling also includes an attachment clip having a central portion including an opening for receiving the tube member and having a plurality of flat attachment legs extending from the central portion in a diverging relationship to each other. Each leg has a window including an attachment edge located within the plane of its flat shape. Each attachment edge has opposite ends and an intermediate portion that extends between the ends thereof and that projects from the ends thereof toward the central portion. The window of each leg also includes a locating edge positioned toward the central portion of the attachment clip from the attachment edge of the window. The female connector member and the annular flange of the tube member each have an associated attachment surface. The attachment surface of the tube member is engaged by the locating edges of the windows of the attachment legs of the attachment clip. The attachment surface of the female connector member has an inner portion that is engaged by the intermediate portions of the attachment edges of the windows in the legs of the attachment clip to secure the female connector member and the tube member to each other. The attachment surface of the female connector member has an outer portion that is located outwardly from the inner portion thereof and farther from the central portion of the attachment clip than its inner portion.

With the construction defined above, the attachment clip can be easily connected and when necessary readily disconnected by outward movement of the legs of the attachment clip but nevertheless has great strength in preventing unintended disconnecting when force is exerted in attempt to pull the tube member from the female connector member.

In the preferred construction disclosed, the central portion of the attachment clip has a curve shape extending between the attachment legs that diverge from each other.

The preferred construction of the quick connect fluid coupling has the tube member flange constructed to include an annular attachment member through which the tube member extends, and this annular attachment member defines the attachment surface of the tube member. The preferred construction of the coupling also includes an O-ring that seals between the female connector member and the tube member. The coupling also is disclosed as including a positioning member of an annular shape through which the tube member projects and that is received within the passage of the female connector member. The positioning member has a first end that engages the O-ring and a second end that engages the annular attachment member of the tube member in an opposed relationship to the locating edges of the windows of the legs of the attachment clip.

In the preferred construction, the intermediate portion of the attachment edge of the window in each leg of the attachment clip has a curve shape extending between the ends of the attachment edge.

In one construction, the attachment surface of the female connector member has a frustoconical shape, while another construction of the attachment surface of the female connector member has a curved annular shape.

One construction discloses the female connector member as having a mounting end for providing mounting thereof during use, while another construction discloses the female connector member having a mounting end that is formed in situ with an object for mounting thereof during use.

The objects, features and advantages of the present invention are readily apparent from the following detailed description of the best modes for carrying out the invention when taken in connection with the accompanying drawings.

BRIEF DESCRIPTION OF DRAWINGS

FIG. 1 is an exploded perspective view of a female connector member, a tube member and an attachment clip of one embodiment of a quick connect fluid coupling constructed in accordance with the present invention.

FIG. 2 is a longitudinal sectional view through the assembled fluid coupling illustrated in FIG. 1 and shows its female connector member mounted by a mounting end thereof on a phantom line indicated object with which the fluid coupling is to be utilized.

FIG. 2a is a longitudinal sectional view similar to FIG. 2 but illustrating another embodiment of the quick connect fluid coupling whose female connector member has a mounting end that is formed in situ with an object for mounting the fluid coupling during use.

BEST MODES FOR CARRYING OUT THE INVENTION

Figure 3:
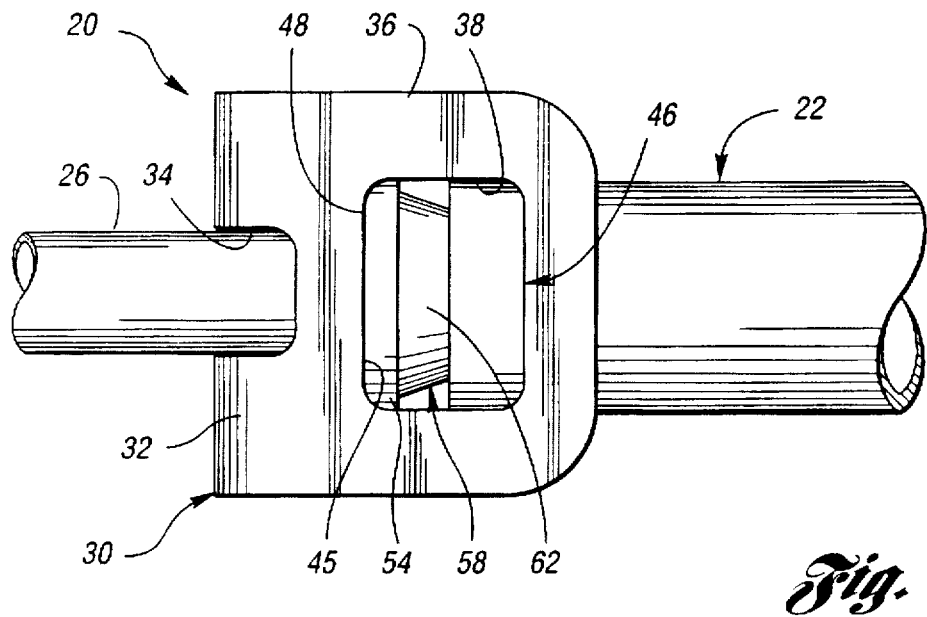
FIG. 3 is a view taken along the direction of line 3—3 in FIG. 2 to further illustrate the fluid coupling.

With reference to FIGS. 1 and 2 of the drawings, one embodiment of a quick connect fluid coupling constructed in accordance with the present invention is generally indicated by 20. This fluid coupling includes a female connector member 22 having a central passage 24 along a central axis A of the coupling. Fluid coupling 20 also includes a tube member 26 that has an annular flange 28 and is also disclosed as including another annular flange 28'. The tube member 26 is received within the passage 24 of the female connector member 22 in fluid communication therewith as illustrated in FIG. 2. An O-ring 29 received by an annular axial seat in the passage 24 of the female connector member 22 seals against the tube 26 in a fluid-tight manner as is hereinafter more fully described.

With continuing reference to FIGS. 1 and 2 and additional reference to FIG. 3, an attachment clip 30 of the fluid coupling 20 has a central portion 32 including an opening 34 for receiving the tube member 26 as shown by the assembled view of FIG. 2. A plurality of flat attachment legs 36 of attachment clip 30 extend from the central portion 32 in a diverging relationship from each other. Each leg 36 has a window 38 including an attachment edge 40 that is located within the plane of the flat shape of the leg. Each attachment edge 40 has opposite ends 42 and an intermediate portion 44 that extends between the ends thereof and that projects from the ends thereof toward the central portion 32 of the attachment clip from which the legs 36 project. As illustrated, there are two of the attachment legs such that the attachment clip 30 can conveniently be manufactured from flat stock by a punching and stamping operation.

With further reference to FIG. 1, the window 38 of each leg also includes a locating edge 45 positioned toward the central portion 32 of the attachment clip 30 from the attachment edge 40 of the window.

With combined reference to FIGS. 1, 2 and 3, the female connector member 22 and the annular flange 28 of the tube member 26 have respective attachment surfaces 46 and 48. The attachment surface 48 of the tube member 26 is engaged by the locating edges 45 of the windows 38 in the diverging attachment legs 36 as is hereinafter more fully described. The attachment surface 46 of the female connector member 22 has an inner portion 50 that is engaged by the intermediate portions 44 of the attachment edges 40 of the windows 38 in the legs 36 of the attachment clip to secure the female connector member and the tube member to each other as best illustrated in FIG. 2. The latter mentioned attachment surface 46 of the female connector member 22 as shown in FIG. 2 has an outer portion 52 that is located outwardly from the inner portion 50 thereof and in the assembled condition of the coupling is located farther from the central portion 32 of the attachment clip than its inner portion.

The construction of the fluid coupling as described above allow a quick connection as the tube member 26 is inserted into the female connector member 22 and the attachment clip 30 is moved toward the female connector member such that its attachment legs 36 are forced outwardly and then snap back inwardly to engage their window attachment surfaces 40 with the attachment surface 46. Also, the construction of the attachment surface 46 in cooperation with the construction of the attachment clip 30 prevents disassembly of the fluid coupling when force is exerted that tends to withdraw the tube member 26 from the female connector member 22. Specifically, the intermediate portion 44 of the attachment edge 40 is captured in what may be termed an undercut manner by the attachment surface 46. Force tending to withdraw the tube member 26 from the female connector member 22 forces the attachment legs 36 inwardly to prevent disassembly. Also, since the attachment edges 40 are in the planes of their associated attachment legs 36, a stronger construction results since there is no tendency to bend as is the case with prior art attachment clips having bent tabs. Nevertheless, a suitable tool such as a screwdriver can be utilized to flex each attachment leg 36 outwardly in a manner that permits disassembly of the attachment clip 30 from the female connector member 22 as each attachment edge 40 is moved outwardly past the outer portion 52 of the attachment surface 46.

As illustrated in both FIGS. 1 and 2, the central portion 32 of the attachment clip 30 has a curved shape extending between the attachment legs 36 that diverge from each other to extend outwardly to the location where the intermediate portions 44 of the window edges engage the attachment surface 46 of the female connector 22.

As shown in both FIGS. 1 and 2, a tube member flange 28 includes an annular attachment member 54 through which the tube member 26 extend. This annular attachment member 54 defines the attachment surface 48 of the tube member flange. More specifically, the annular attachment member 54 is located between the two annular flanges 28 and 28' of the tube member 26 so as to be restrained from movement in opposite axial directions. Attempted withdrawal or further insertion of the tube member 26 with respect to the female connector member 22 engages the one annular flange 28 of the tube member with the annular attachment member 54 which is restrained by the attachment clip 30 so as to thereby prevent such withdrawal.

As previously mentioned, the coupling 20 includes an O-ring 29 that seals between the female connector member 22 and the tube member 26. An axial seat 56 of the female connector member passage 24 seats the O-ring against axial movement. A positioning member 58 of the coupling has an annular shape through which the tube member 26 projects and is received within the passage 24 of the female connector member 22. The positioning member 58 is made from a suitable plastic such as nylon and has a first end 60 that engages the O-ring 29 within the female connector member passage 24. A second end 62 of the positioning member 58 has an outwardly extending generally frustoconical shape that engages the annular attachment member 54 of the tube member 26 in an opposed relationship to the locating edges 45 of the windows of the legs 36 of attachment clip 30. This construction securely locates the attachment clip and thereby prevents any rattling as well as cooperating with the O-ring 29 to ensure the sealing between the female connector member 22 and the tube member 26.

Figure 4:
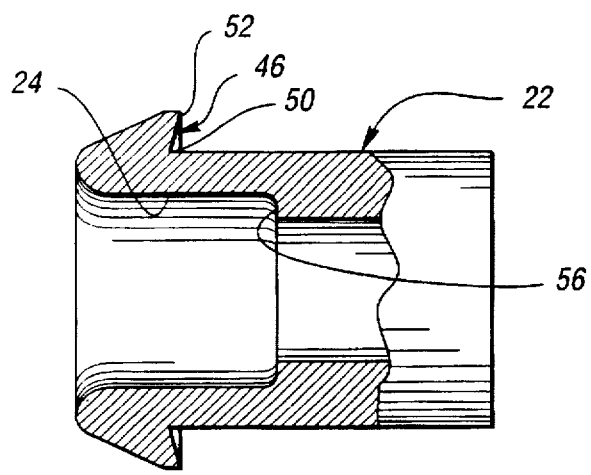
FIG. 4 is a partial view taken partially in section to illustrate one embodiment of the female connector member whose attachment surface has a frustoconical shape.
Figure 5:
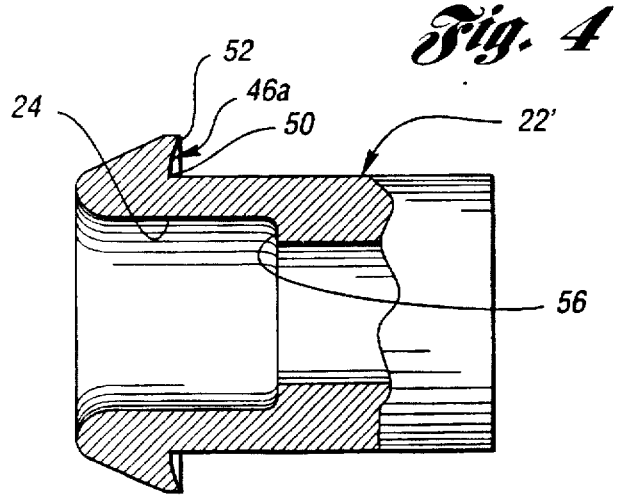
FIG. 5 is a partial view similar to FIG. 10 of another embodiment of the female connector member whose attachment surface has an annular construction with a curved shape in a cross-sectional direction as illustrated.

With reference to FIGS. 4 and 5, the female connector member attachment surface 46 that is engaged by the attachment edges of the attachment clip can have different shapes. Specifically as illustrated in FIG. 4, the attachment surface 46 has a frustoconical shape extending between its inner and outer portions 50 and 52 on the female connector member shown. Furthermore, as illustrated in FIG. 5, the attachment surface 46a of the female connector member 22' has an annular construction with a curved shape in a cross-sectional direction as illustrated extending between the inner and outer portions 50 and 52.

With reference to FIG. 1, the fluid coupling 20 illustrated has its female connector member 22 provided with a mounting end 64 that can be mounted as shown in FIG. 2 on an object 66 with which the coupling is to be utilized, such as a brake component, a transmission housing or a fuel system component, etc. This mounting can be provided by a threaded connection, welding, brazing or any other suitable type of connection.

In another construction of the fluid coupling identified by 20a in FIG. 2a, the female connector member 22a has its mounting end 64a formed in situ with the object 66 with which the fluid coupling is to be utilized. Specifically, the female connector member 22a is illustrated as being cast from metal with the mounting end 64a thereof cast with the object 66a which as mentioned above can be a vehicle brake component, a transmission housing or a fuel system component, etc.

While the best modes for carrying out the invention have been described in detail, those familiar with the art to which this invention relates will recognize various alternative designs and constructions for practicing the invention as defined by the following claims.

What is claimed is:

1. In a quick connect fluid coupling including a female connector member having a central passage and also including a tube member that has an annular flange and is received by the passage of the female connector member in fluid communication therewith, the invention comprising:

an attachment clip having a central portion including an opening for receiving the tube member and having a plurality of flat attachment legs extending from the central portion in a diverging relationship from each other, each leg having a window including an attachment edge located within the plane of the flat shape thereof, each attachment edge having opposite ends and an intermediate portion that extends between the ends thereof and that projects from the ends thereof toward the central portion, and the window of each leg also including a locating edge positioned toward the central portion of the attachment clip from the attachment edge of the window; and the female connector member and the annular flange of the tube member each having an associated attachment surface, the attachment surface of the tube member being engaged by the locating edges of the windows of the attachment legs of the attachment clip, the attachment surface of the female connector member having an inner portion that is engaged by the intermediate portions of the attachment edges of the windows in the legs of the attachment clip to secure the female connector member and the tube member to each other, and the attachment surface of female connector member having an outer portion that is located outwardly from the inner portion thereof and farther from the central portion of the attachment clip than its inner portion.

2. A quick connect fluid coupling as in claim 1 wherein the central portion of the attachment clip has a curved shape extending between the attachment legs that diverge from each other.

3. A quick connect fluid coupling as in claim 1 wherein the tube member flange includes an annular attachment member through which the tube member extends, the annular attachment member defining the attachment surface of the tube member flange.

4. A quick connect fluid coupling as in claim 3 further including an O-ring that seals between the female connector member and the tube member, a positioning member of an annular shape through which the tube member projects and that is received within the passage of the female connector member, the positioning member having a first end that engages the O-ring and a second end that engages the annular attachment member of the tube member in an opposed relationship to the locating edges of the windows of the legs of the attachment clip.

5. A quick connect fluid coupling as in claim 1 wherein the intermediate portion of the attachment edge of the window in each leg of the attachment clip has a curved shape extending between the ends of the attachment edge.

6. A quick connect fluid coupling as in claim 1 wherein the attachment surface of the female connector member has a frustoconical shape.

7. A quick connect fluid coupling as in claim 1 wherein the attachment surface of the female connector member has a curved annular shape.

8. A quick connect fluid coupling as in claim 1 wherein the female connector member has a mounting end for providing mounting thereof during use.

9. A quick connect fluid coupling as in claim 1 wherein the female connector member has a mounting end that is formed in situ with an object for mounting thereof during use.

10. In a quick connect fluid coupling including a female connector member having a central passage and also including a tube member that has an annular flange and is received by the passage of the female connector member in fluid communication therewith, the invention comprising:

an attachment clip having a curved central portion including an opening for receiving the tube member and having a plurality of flat attachment legs extending from the central portion in a diverging relationship from each other, each leg having a window including an attachment edge located within the plane of the flat shape thereof, each attachment edge having opposite ends and an intermediate portion that extends between the ends thereof and that projects from the ends thereof toward the central portion, and the window of each leg also including a locating edge positioned toward the central portion of the attachment clip from the attachment edge of the window; and the female connector member having an attachment surface, the tube member flange including an annular attachment member through which the tube member extends, the annular attachment member defining the attachment surface of the tube member flange, the attachment surface of the annular attachment member being engaged by the locating edges of the windows of he attachment legs of the attachment clip, the attachment surface of the female connector member having an inner portion that is engaged by the intermediate portions of the attachment edges of the windows in the legs of the attachment clip to secure the female connector member and the tube member to each other, the attachment surface of female connector member having an outer portion that is located outwardly from the inner portion thereof and farther from the central portion of the attachment clip than its inner portion, an O-ring that seals between the female connector member and the tube member, a positioning member of an annular shape through which the tube member projects and that is received within the passage of the female connector member, and the positioning member having a first end that engages the O-ring and a second end that engages the annular attachment member of the tube member in an opposed relationship to the locating edges of the windows of the legs of the attachment clip.

* * * * *